W. A. KITTS, Jr.
SAFETY WATER GLASS FITTING.
APPLICATION FILED APR. 16, 1917.
1,250,321.
Patented Dec. 18, 1917.
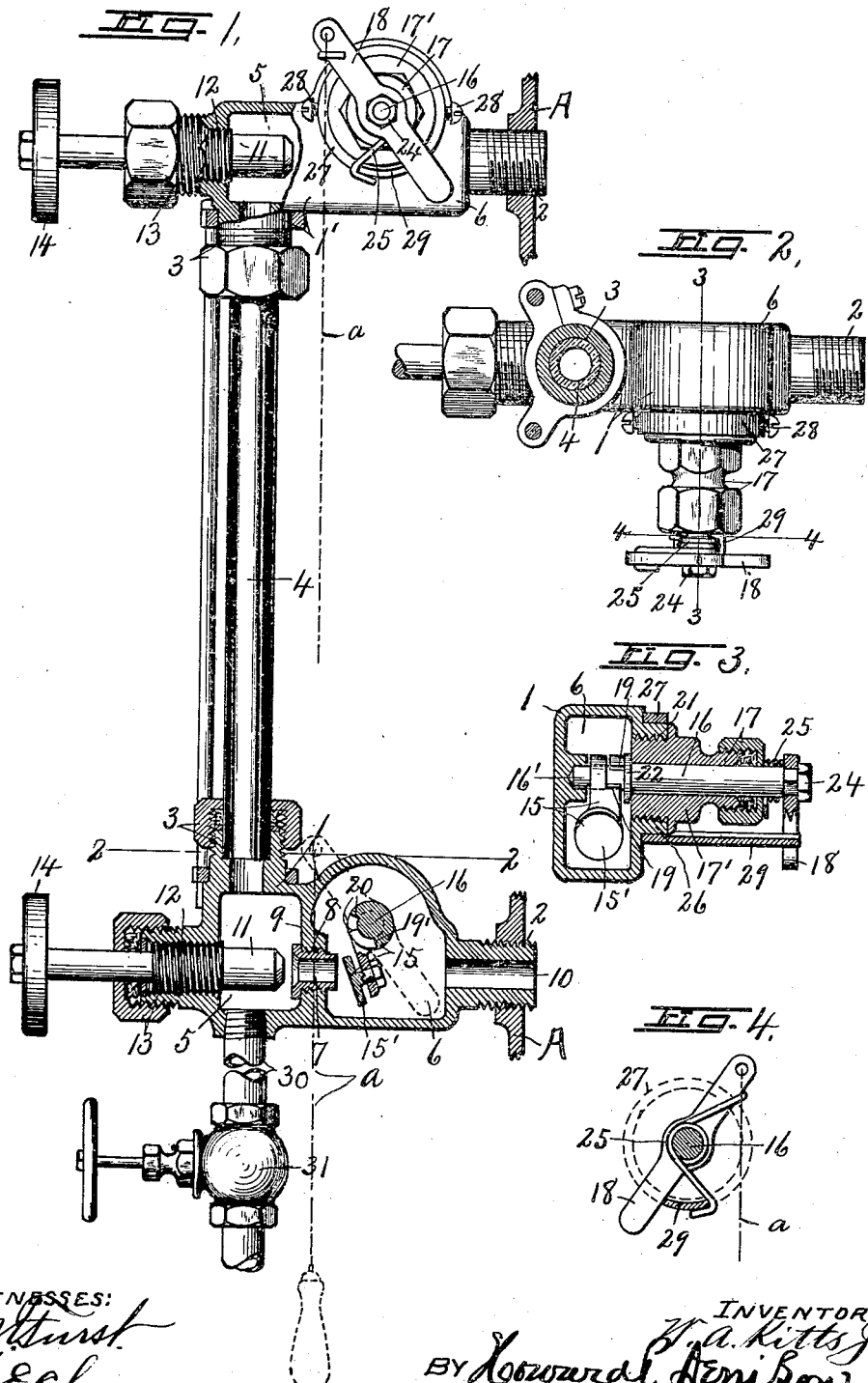

UNITED STATES PATENT OFFICE.

WILLARD A. KITTS, JR., OF MOUNTAIN LAKES, NEW JERSEY.

SAFETY WATER-GLASS FITTING.

1,250,321.   Specification of Letters Patent.   Patented Dec. 18, 1917.

Application filed April 16, 1917. Serial No. 162,485.

*To all whom it may concern:*

Be it known that I, WILLARD A. KITTS, Jr., a citizen of the United States of America, and resident of Mountain Lakes, in the county of Morris, in the State of New Jersey, have invented new and useful Improvements in Safety Water-Glass Fittings, of which the following, taken in connection with the accompanying drawings, is a full, clear, and exact description.

This invention relates to certain improvements in safety water glass fittings in which the water and steam valves are equipped with safety valves adapted to close automatically by pressure in case the water glass should break from any cause, thus reducing the dangers from escaping steam and hot water, and also permitting the main valves to be closed without danger to the operator until the glass can be replaced with a new one.

In devices of this character, it is necessary to normally sustain the safety valves in position for automatic operation and also to provide means whereby they may be positively opened at will after such automatic closing, and the main object of my present invention is to render this sustaining means and operating means more efficient and reliable than has heretofore been practised.

Another object is to simplify the construction and operation of the valve mechanism by reducing the number of parts to a minimum, and at the same time providing means whereby the safety valve may be easily and quickly removed and repaired when necessary without necessitating extra holes or fittings in or upon the valve case.

A further object is to provide simple means whereby the safety valve may be thrown out of alinement with the passage which it controls to permit the insertion of a suitable tool entirely through said passage and into the nipple for cleaning the same from any obstructions which may tend to lodge therein, or otherwise obstruct the passage.

Other objects and uses relating to specific parts of the device will be brought out in the following description.

In the drawings—

Figure 1 is a longitudinal vertical sectional view partly in elevation of a safety water glass fitting embodying the various features of my invention, a portion of the water glass being broken away.

Fig. 2 is a horizontal sectional view through the upper portion of the lower valve, taken on line 2—2, Fig. 1.

Figs. 3 and 4 are detail sectional views taken, respectively, in the plane of lines 3—3 and 4—4, Fig. 2.

As illustrated, this fitting comprises lower and upper valve cases —1— and —1'— having threaded nipples —2— for attachment to a boiler or water and steam column and provided in their adjacent sides with suitable glands or stuffing boxes —3— for receiving the opposite ends of a water glass —4—.

Each valve case is provided with two valve chambers —5— and —6— which are connected by an externally threaded tubular bushing —7— adjustably engaged in threaded apertures —8— in a partition —9— between said valve chambers, the tubular bushings —7— being coaxial with the inlet openings —10— in the corresponding tubular nipples —2— at the inner ends of the valve chambers —6— and are also coaxial with their respective main controlling valves —11—, which latter are provided with threaded portions —12— screwing into adjacent glands or stuffing boxes —13— in the outer sides of the valve chambers —5—, and have external operating members consisting of hand-wheels —14—.

Mounted within the chambers —6— are normally open safety check-valves —15— loosely mounted upon suitable spindles —16— which extend to the exterior of the case through glands —17— and are provided at their outer ends with operating members, as levers, —18— by which they may be opened (after the main valves are closed) in case they should stick to their seats after being closed by the pressure of escaping steam, or each lever being provided with a separate pull-cord or cable —a— by which it may be conveniently operated when necessary.

The opposite ends of each of the tubular bushings —7— constitute valve seats, one for the main valve —11— and the other for the corresponding check valve —15—, said bushing being adjustable axially to bring it into proper position or relation to the valve —15—.

Each check valve —15— and its supporting spindle —16— are arranged to allow the valve to open automatically by its own weight, and for this purpose the spindle —16— is journaled in opposite walls of the valve chamber —6— just above the adjacent end of the tubular bushing —7— with its axis slightly beyond the vertical plane of the outer end face of said bushing, so that the predominance of weight of the valve —15— will cause it to open, the portion of the valve engaging the spindle constituting a rock arm upon which is loosely mounted or swiveled a separately movable member —15'— adapted to close squarely against its seat.

The head of the valve —15— is loosely journaled upon the reduced inner end —16'— of the spindle —16— so as to have a limited rocking movement relatively thereto and is provided with a stop shoulder —19— coacting with a similar stop shoulder on the spindle to limit the opening movement of the valve —15— to a position slightly separated from its seat.

The opposite sides of the spindle —16— and hub of the valve —15— are provided with additional coöperative shoulders —20—, whereby the safety valve may be forced from its seat to its open position after being closed from any cause, although, as previously stated, the weight of the valve is usually sufficient to open it automatically.

One of the sections, as —17'—, of the gland —17— is threaded externally and screwed into an opening —21— in the adjacent side of the valve chamber —6—, said opening being of sufficient size to allow the valve —15— to pass therethrough when the gland with the spindle therein is removed.

The inner end of the spindle —16— is provided with an annular shoulder —22— abutting against the inner end face of the gland section —17'— and serves the double purpose of packing the inner end of the journal opening for the spindle against leakage, and also to prevent the spindle from being blown out endwise through the gland by pressure from within the valve chamber —6—.

The outer end of each of the valve spindles —16— is provided with an operating member consisting, in this instance, of a lever —18— secured thereto by a lock nut —24— and adapted to be operated in one direction by a retracting spring —25— which is coiled around the outer end of the spindle in the manner shown more clearly in Figs. 3 and 4.

The side of the valve chamber —6— in which the gland bushing —17'— is secured is provided with an annular boss —26— concentric with the spindle —16—, and upon this boss is mounted for rotary adjustment a collar —27— which is held in its adjusted position by one or more set screws —28—, said collar being provided with an axially extending arm —29— projecting some distance beyond the outer end of the gland —17— and into the path of movement of opposite ends of the operating lever —18— to limit the rotary movement thereof, and thereby limiting the rocking movement of the spindle —16— and valve-supporting arm —15'—.

One end of the retracting spring —25— is attached to the lever —18— and its other end bears against one side of the stop arm —29— for normally and yieldingly holding the adjacent end of the lever against one edge of said arm, in which position the valve —15— will be sustained in a partially open position by the shoulders —19— ready to close automatically in case the water glass should break, it being understood that when the shoulders —19— are in engagement with each other, the opposite shoulders —20— will be separated a sufficient distance to allow the valve to close, so that if either valve —15— should cling to its seat after the main valves —11— have been closed, it may be opened forcibly by operating the corresponding lever —18— against the action of its retracting spring —25—.

The object of the rotary adjustment of the collar —27— is to not only permit the spindle —16— and safety valve —15— to be properly adjusted relatively to each other and to the valve seat for automatic operation of the valve in case the glass should break, but when loosened permits the safety valve to be rocked out of alinement with the passage through the nipple —2—, so that in the absence of steam and water in both gage cocks a suitable cleaning tool may be passed through said passage for removing any foreign matter which may tend to accumulate therein, it being apparent that the openings in the gland —13—, bushing —7— and nipple —2— are coaxial, thus forming a straight passage for the cleaning tool.

These safety valves are usually operated with considerable force, both by the operator and the retracting spring —25—, and it, therefore, follows that the limiting stops are subjected to more or less severe strains, and in order to secure greater permanency and durability each stop-arm —29— is formed directly upon the collar —27— and stands out radially some distance from the axis of movement of the lever —18— with which it is adapted to engage, thereby reducing the force of impact as the lever is operated against said abutments in either direction.

It is frequently necessary to blow out the water glass in order to keep it free from accumulations of sediment, and for this purpose I have provided the lower valve with a drainage outlet pipe —30— having therein a normally closed controlling valve —31— which is opened only when the water glass is to be blown out and permits such valve to be placed some distance below the water gage where it is more accessible and more remote from the danger zone of the water glass.

During this latter operation it is, of course, necessary to hold the valves —15— open by means of the pull-cords —a—, as otherwise they would close automatically and prevent the escape of the steam and water through the glass and drainage cock.

Each of the chambers —5— and its valve —11— constitutes what may be termed a gage-cock or main valve of the water gage fitting, while each chamber —6— and its corresponding valve —15—, together with its restoring means, may be termed the automatic check-valve or safety appliance as an adjunct to the gage-cock adapted to be closed by the flow of fluid from the receptacle as —A— through the gagecock when the latter is discharging either by voluntary opening of the valve —11— or by accidental breakage of the glass or other parts of the fitting.

The operation of my invention will now be readily understood, and while I have shown a particularly practical and efficient means for carrying out the various objects, it is evident that various changes may be made in the form and arrangement of the various parts without departing from the spirit of such invention, and, therefore, I do not limit myself to the exact mechanism shown and described.

What I claim is:

1. The combination with a gage-cock for steam boilers, of a normally open self-opening check-valve in the connection between said boiler and gage-cock, and adjustable means for limiting the opening movement of the check-valve to vary the degree of such opening.

2. In a safety water-glass fitting, a valve case having two valve chambers and a connecting passage between them, a water-glass communicating with one of said chambers, normally open valves coacting with opposite ends of said passage for controlling communicating between the chambers, one of the valves being adapted to be operated by the pressure of fluid from the boiler to automatically close communication between said chambers in case of breakage of the water-glass for safety purposes, an operating stem for the said safety valve extending through one side of the case and provided with external operating means, and a stop on the exterior of the case projecting into the path of movement of said operating means for limiting the movement of the valve in one direction.

3. In a safety water-glass fitting, a valve chamber having inlet and exit openings and a bushing in one side, a normally open safety valve in said chamber and adapted to close the exit passage by pressure of fluid from the boiler to which the inlet is connected, in case of breakage of the glass, said valve having a stem extending through said bushing and provided with an external operating member, a collar adjustable around the inner end of the bushing and provided with a stop projecting into the path of movement of said operating member for limiting such movement.

4. In a safety water-glass fitting, a valve chamber having coaxial inlet and exit openings and a bushing in one side thereof, a valve stem extending through and rotatable in the bushing and provided with stop shoulders at opposite sides of its axis, a safety valve loosely mounted on the inner end of the stem within said chamber and normally open, said valve being adapted to close the exit passage by pressure of fluid from the boiler through the inlet in case of breakage of the glass and provided with shoulders coöperating with the first-named shoulders on the stem to limit its rocking movement relatively to said stem, one set of coacting shoulders being disposed to sustain the valve in its normally open position, the other set of shoulders serving to positively open the valve as the stem is turned in the proper direction, an operating member on the outer end of the valve stem, a stop arm on the exterior of the case for limiting the movement of the operating member and valve stem in the direction of closing movement of the valve, and means for yieldingly holding the operating member against said stop, whereby the operating member may be moved against the action of the yielding means for opening the valve.

5. In a safety water-glass fitting, a valve case having an inlet adapted to be connected to a boiler and an outlet for communication with the water glass, a valve for the outlet adapted to close by pressure from the boiler in case of breakage of the glass, said valve chamber having an opening in one side of sufficient size to permit the valve to pass therethrough and having a bushing therein, a valve stem extending through the bushing and upon which the valve is loosely mounted for closing movement independently of the stem, co-acting stops between the valve and stem for sustaining the valve in its normally open position, an operating lever on the outer end of the valve stem, a collar adjustable rotarily about the axis of the bushing and provided with a stop arm projecting into the path of movement of the lever, and a retracting spring for the valve stem and lever and normally holding said lever against one of the stops.

In witness whereof I have hereunto set my hand this tenth day of April, 1917.

WILLARD A. KITTS, Jr.

Witnesses:
SAMUEL WEINIK,
P. R. HUGHES.

Copies of this patent may be obtained for five cents each, by addressing the "Commissioner of Patents, Washington, D. C."